United States Patent
Cook et al.

[11] Patent Number: 5,118,480
[45] Date of Patent: Jun. 2, 1992

[54] METHOD FOR REMOVING HCL AND HF FROM COAL DERIVED FUEL GAS

[75] Inventors: Charles Cook, Wayne; Eli Gal, Lititz, both of Pa.

[73] Assignee: General Electric Environmental Services, Incorporated, Lebanon, Pa.

[21] Appl. No.: 543,131

[22] Filed: Jun. 25, 1990

[51] Int. Cl.$^5$ .............................................. C01B 17/16
[52] U.S. Cl. ................................ 423/230; 423/240 S; 423/244
[58] Field of Search ...................... 423/240, 230, 244

[56] References Cited

U.S. PATENT DOCUMENTS

| | | | |
|---|---|---|---|
| 1,626,664 | 5/1927 | Brady | 423/231 |
| 1,816,533 | 7/1931 | Huff et al. | 423/231 |
| 2,259,409 | 10/1941 | Wenzel et al. | 23/148 |
| 2,682,444 | 6/1954 | Phillipps | 423/231 |
| 2,983,573 | 5/1961 | Moore et al. | 423/231 |
| 4,008,174 | 2/1977 | Jacobson et al. | 252/411 |
| 4,088,736 | 5/1978 | Courty et al. | 423/230 |
| 4,089,809 | 5/1978 | Farrior, Jr. | 252/459 |
| 4,251,495 | 2/1981 | Deschamps et al. | 423/230 |
| 4,273,749 | 6/1981 | Kimura et al. | 423/231 |
| 4,310,497 | 1/1982 | Deschamps et al. | 423/230 |
| 4,366,131 | 12/1982 | Fox | 423/231 |
| 4,435,371 | 3/1984 | Frech et al. | 423/228 |
| 4,442,078 | 4/1984 | Jalan et al. | 423/230 |
| 4,473,363 | 9/1984 | Poller et al. | 423/240 S |
| 4,478,800 | 10/1984 | van der Wal et al. | 423/230 |
| 4,489,047 | 12/1984 | de Jong et al. | 423/230 |
| 4,555,391 | 11/1985 | Cyran et al. | 423/244 |
| 4,668,489 | 5/1987 | Alexander et al. | 423/240 S |
| 4,767,605 | 8/1986 | Lindbauer et al. | 423/240 S |
| 4,857,285 | 8/1989 | Gal | 423/230 |
| 4,908,195 | 5/1990 | Wanner et al. | 423/240 S |
| 4,927,430 | 5/1990 | Calderon | 423/230 |

FOREIGN PATENT DOCUMENTS

| | | | |
|---|---|---|---|
| 173640 | 7/1984 | European Pat. Off. | 423/240 S |
| 56-152727 | 4/1980 | Japan | 423/240 S |
| 1550354 | 8/1979 | United Kingdom . | |
| 2106532A | 4/1983 | United Kingdom . | |

OTHER PUBLICATIONS

Strickland et al., "Analysis of Fuel Gas Cleanup for Molten Carbonate Fuel Cells", 1985.

Flytzani-Stephanopoulos, "Detailed Studies of Novel Regenerable Sorbents for High-Temperature Coal-Gas Desulfurization", 1987.

Markel et al., "Proceedings of the Sixth Annual Contractors Meeting on Contaminant Control in Coal-Derived Gas Streams".

Primary Examiner—John Niebling
Assistant Examiner—Brian M. Bolam
Attorney, Agent, or Firm—Nixon & Vanderhye

[57] ABSTRACT

A process is provided for the removal of HCl and HF from a hot gas stream concurrently with the removal of sulfur compounds. The process involves the introduction of an HCl/HF sorbent such as nahcolite, sodium bicarbonate, sodium carbonate or Trona in powder form into the process stream at any one or all of four alternative locations in an amount sufficient to break down the HCl and HF into solid salts which are subsequently removed from the stream.

27 Claims, 1 Drawing Sheet

METHOD FOR REMOVING HCL AND HF FROM COAL DERIVED FUEL GAS

BACKGROUND AND SUMMARY OF THE INVENTION

This invention relates to a process for removing HCl and HF from coal derived fuel gas at elevated temperatures by contacting the gas with sorbents such as nahcolite, sodium bicarbonate or sodium carbonate in a powder form.

In coal gasification processes, the coal derived fuel gas contains HCl and HF at a combined concentration of about 50-1000 ppm. These gas species are acidic in a wet environment and it is desirable that they be removed to prevent corrosion of downstream equipment and to minimize acid gas emissions to the environment.

At the same time, it is well known that gases derived from coal gasification techniques also contain sulphur compounds which must be removed in order to meet environmental standards and to prevent damage to equipment. These sulphur compounds generally include primarily hydrogen sulphide ($H_2S$) and, in lesser amounts, carbonyl sulphide (COS) and the like. A great deal of attention has been focused on sulfur compound removal from gases. For example, see U.S. Pat. Nos. 1,816,533; 2,259,409; 2,682,444; 2,983,573; 4,088,736; 4,089,809; 4,251,495; 4,273,749; 4,310,497; 4,435,371; 4,442,078; 4,478,800; and 4,489,047.

A process for removing sulphur species and particulates from coal derived fuel gases was disclosed in commonly owned U.S. Pat. No. 4,857,285, the entirety of which is expressly incorporated herein by reference.

Briefly, in the '285 patent, a process is described for removing gaseous sulfur compounds from a hot gas by (a) contacting the hot gas with at least one metal oxide sorbent in a bed of metal oxide sorbent which is movable in a direction countercurrently to the hot gas, whereby the metal oxide sorbent reacts with the hydrogen sulfide and other sulfide compounds to form a spent or sulfur-rich metal sorbent and a hot gas lean in or depleted of sulfur compounds; (b) removing the hot gas lean in sulfur from the bed of metal oxide sorbent; (c) contacting the sulfur-rich metal sorbent with a first oxygen-containing gas which moves cocurrently in the direction of a movable bed of the sulfur-rich metal absorber in a first phase regeneration to convert, in an exothermic reaction, sulfur-rich metal sorbent to a partially-sulfided sorbent (partially spent metal-sulfur compound), thereby forming a sulfur dioxide-containing gas; (d) contacting the partially-sulfided sorbent with a second oxygen-containing gas which moves co-currently in the direction of a movable bed of the partially-sulfided sorbent in a second phase regeneration to convert, in an exothermic reaction, the partially-sulfided sorbent to regenerated or re-usable metal oxide and thereby forming additional sulfur dioxide-containing gas, the first oxygen-containing gas having a concentration of oxygen which is less than the concentration of oxygen in the second oxygen-containing gas; (e) contacting the regenerated metal oxide with air, oxygen-enriched air or oxygen which moves countercurrently to the direction of a movable bed of the regenerated metal oxide to ensure completion of regeneration, to cool the regenerated metal oxide and to purge the regenerated metal oxide of sulfur dioxide-containing gas; (f) removing the sulfur dioxide-containing gas purged from the regenerated metal oxide; and (g) reusing the regenerated metal oxide in step (a). In an optional step, the patent indicates that a slip stream of the hot gas lean in sulfur compounds may be passed through regenerated metal oxide whereby residual metal sulfate compounds in the regenerated metal oxide are decomposed, and oxidized regenerated metal oxide is chemically reduced.

It would be advantageous of course to be able to remove HCl and HF concurrently with the removal of the sulfur compounds, but no such process has heretofore been available. This invention relates to a process for removing HCl and HF compounds which can be coupled with the desulfurization process as described in the '285 patent.

By way of background, it has been experimentally confirmed in the laboratory that HCl can be removed from coal gas via contact with a sorbent such as nahcolite. The known chemical reaction between HCl and nahcolite is as follows:

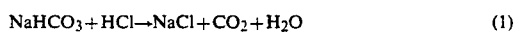

$$NaHCO_3 + HCl \rightarrow NaCl + CO_2 + H_2O \qquad (1)$$

Similarly, the chemical reaction between HF and nahcolite is as follows:

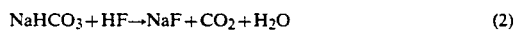

$$NaHCO_3 + HF \rightarrow NaF + CO_2 + H_2O \qquad (2)$$

The products of both reactions are gaseous $CO_2$ and $H_2O$, and solid salts, i.e., NaCl in the case of reaction (1) and NaF in the case of reaction (2).

Krishnan et al. in a publication entitled: "High Temperature Coal Gas Chloride Clean-up for Molten Carbonate Fuel Cell Applications, Final Report" (G. N. Krishnen, G. T. Tong, B. J. Wood and N. Korens, Nov. 1986) reported laboratory experiments in which coal gas chloride removal was performed at 527° to 650° C. It was found that HCl can be removed effectively from a concentration of 300 ppm to a concentration of 1-5 ppm in a fixed bed with a rather short residence time. Their proposed commercial scale HCl removal concept consists of two fixed bed vessels containing pelletized nahcolite. One vessel absorbs HCl and HF, the other is maintained on a standby basis, or is used for loading/unloading sorbent/reaction product respectively.

The present invention relates to coupling a simple and cost effective process for removing the HCl and HF with the existing sulphur compound removal process as disclosed in the above identified '285 patent in the treatment of coal derived fuel gas. As a result, a system is provided which is capable of removing all of the major pollutants from the coal derived fuel gas.

With reference now to FIG. 1, a system for removing sulphur species and particulates from coal derived fuel gases at elevated temperature and pressure is shown generally at 10. A stream 12 of coal derived fuel gas containing particulate matter, sulphur species including $H_2S$, COS and $CS_2$, as well as HCl and HF, at a temperature of between 350°-700° C. and a pressure of up to 600 p.s.i.g. flows into a primary cyclone 14 which removes entrained particulates via stream 16. The gas effluent from the primary cyclone 14 flows away from the primary cyclone via stream 18 and is injected into an absorber 20. The absorber 20 comprises a countercurrent moving bed reactor containing a metal oxide in granular form. The metal oxide is an absorbent which reacts with the sulphur species to form metal sulphide. The absorber also comprises a granular bed filter which further removes entrained particles from the gas stream 18. The particulates captured by the absorber 20 move with the bed material in a stream 22 into a regenerator 24. A stream 26 carries the particulates from the regenerator 24 to a fines separator 28 located below the regenerator. The fine particulates separated within the separator 28 are carried away from the separator in stream 30, while coarse material from the fines separator 28 is led via stream 32 to a sorbent elevator 34 which recycles the coarse material via a stream 36 back to the top of the absorber 20.

The primary stream 38 of cleaned gas from the absorber 20 is directed to a secondary cyclone 40 for additional particulate removal. It will be understood by those of ordinary skill in the art that stringent emission requirements may require the replacement of the secondary cyclone with a conventional barrier filter or the like. Particulates are carried away from the secondary cyclone or barrier filter 40 via stream 42, while cleaned gas exits the secondary cyclone or alternate particulate removal system via stream 44, and is fed to a power plant which may comprise a gas turbine generator 45.

In accordance with this invention, a process for removing HCl and HF from coal derived fuel gas in combination with the removal of sulphur species and particulates as described above is provided.

Specifically, the removal of HCl and HF is achieved by contacting nahcolite ( a naturally occurring form of sodium bicarbonate), sodium bicarbonate, sodium carbonate or Trona (a naturally occurring mixture of sodium bicarbonate and sodium carbonate) in a powder form with the coal derived fuel gas stream at elevated temperatures. With specific reference to the sulphur removal system described above, and as disclosed in the '285 patent, four alternate locations have been identified for the introduction of the sorbent material as described in greater detail further herein.

In its broader aspects, therefore, the present invention relates to an improved process for removing HCl and HF in a known process for removing sulfur compounds from a hot gas stream containing $H_2S$, COS, HCl and HF comprising:
  (a) introducing a sorbent material at a location and in an amount effective to break down at least the HCl and HF constituents into solid salts and gaseous $CO_2$ and $H_2O$; and
  (b) removing the solid salts from the stream.

In another aspect, the invention relates to a process for removing pollutants from a hot sulphur and hydrogen chloride and/or hydrogen fluoride laden gas stream comprising the steps of:
  (a) passing the stream into a primary cyclone;
  (b) passing gas effluent from the primary cyclone into an absorber containing a sulfur sorbent;
  (c) passing a primary stream of cleaned gas from the absorber into a secondary cyclone or alternate particulate removal system for additional removal of particulate material from the primary stream; and
  (d) introducing an HCl/HF sorbent into the process stream in an amount and at a location effective to react with HCl/HF in the gas stream to produce solid NaCl and NaF, gaseous $CO_2$ and $H_2O$.

In still another aspect, the invention relates to a process of removing pollutants from a hot sulfur and hydrogen chloride and/or hydrogen fluoride laden gas stream comprising the steps of:
  (a) passing the stream into a primary cyclone;
  (b) passing gas effluent from the primary cyclone into an absorber containing a sulfur sorbent;
  (c) passing a primary stream of cleaned gas from the absorber into a secondary cyclone or alternate particulate removal system for additional removal of particulate material from the primary stream;
  (d) simultaneously with step (c), passing particulates captured in the absorber to a regenerator;
  (e) passing particulates from the regenerator to a fines separator;
  (f) passing coarse material from the fines separator to a sorbent elevator;
  (g) recycling coarse material from the sorbent elevator to the absorber; and
  (h) introducing an HCl/HF sorbent into the process stream in an amount and at a location effective to react with HCl and/or HF in the gas stream to produce solid NaCl and/or NaF, gaseous $CO_2$ and $H_2O$.

Additional objects and advantages of the invention disclosed herein will be apparent from the detailed description which follows.

DETAILED DESCRIPTION OF THE DRAWING

Figure 1:
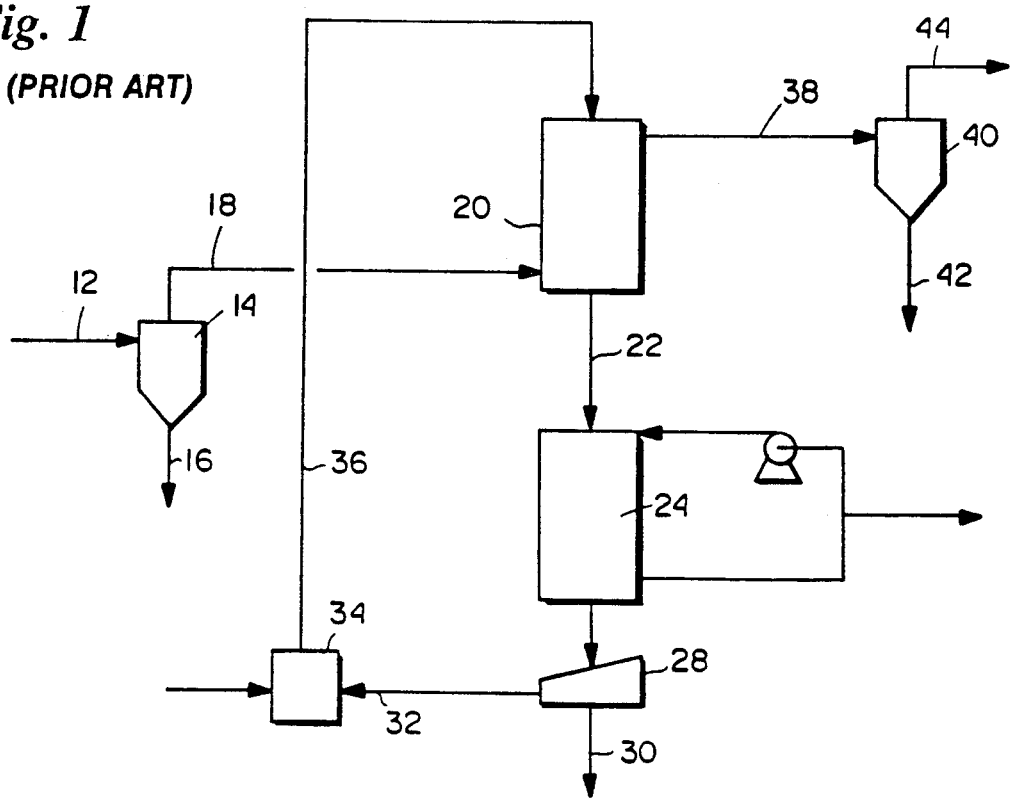
FIG. 1 represents a schematic diagram of a prior art process for removing sulfur compounds from coal derived fuel gas.
Figure 2:
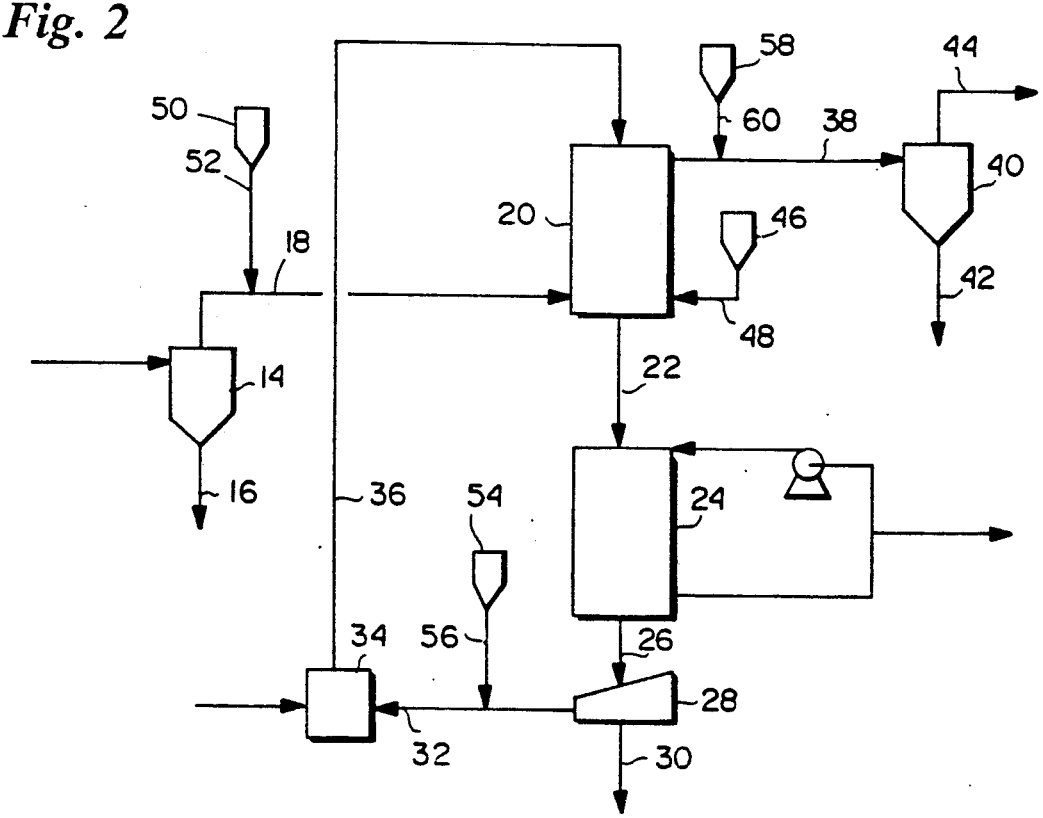
FIG. 2 represents a schematic diagram as shown in FIG. 1 but further illustrating alternative locations for the introduction of an additional sorbent in accordance with this invention.

Referring now to FIG. 2, where identical reference numerals are used to denote elements in common with FIG. 1, the improved process of this invention is illustrated.

In a first exemplary embodiment of this invention, an HCl/HF sorbent, preferably nahcolite, is injected directly from a hopper 46 into a stream 48 near the bottom of the absorber 20, preferably just above the plane of fuel gas introduction into the absorber from the stream 18. The HCl/HF sorbent powder will then be pneumatically transported upward through the downward moving metal oxide/sulphide bed within the absorber 20 to provide extended residence time for reaction. The solid salts formed will be transported to the regenerator 24 via stream 22 and ultimately separated in the fines separator 28. Elutriated HCl/HF sorbent will be captured in the downstream secondary cyclone or barrier filter 40 via stream 38.

In an alternative embodiment of the subject invention, injection of an HCl/HF sorbent is made from a hopper 50 via stream 52 directly into the coal derived fuel gas stream 18 downstream of the primary cyclone 14. In this arrangement, the sorbent reacts with the HCl/HF during the relatively short flow time within the stream 18, and is then captured in the metal oxide sorbent bed where more HCl/HF removal is achieved. A fraction of the captured powder moves with the much coarser sulphur sorbent into the regenerator 24 via stream 22 and thereafter down into the fines separator 28 via stream 26 where it is carried away with the fine material via stream 30. The balance of the sorbent percolates through the bed capturing more HCl and is entrained from the top of the absorber 20 into the stream 38 to be captured in the secondary cyclone or barrier filter 40.

In a third alternative arrangement in accordance with this invention, an HCl/HF sorbent from a hopper 54 is injected via stream 56 directly into the sulphur sorbent in stream 32 between the fines separator 28 and the sorbent elevator 34. The mixed sorbent is then charged to the absorber 20 using the sorbent elevator 34. The contact of HCl/HF sorbent with the coal derived fuel gas occurs at the top of the absorber 20 and a fraction of the HCl/HF sorbent moves down through the absorber 20, regenerator 24 to the fines separator 28. The balance of the sorbents reacts with the HCl/HF at the upper end of the absorber reactor during flight as it is entrained from the reactor into the gas stream 38 and introduced into the secondary cyclone or barrier filter 40.

For applications of the process where HCl and HF removal from a coal derived gas is required, the above described embodiments are preferred to the extent that the introduction of the HCl/HF sorbent into the absorber 20 takes advantage of the increased residence time afforded by the moving bed reactor, to thereby optimize the removal of the HCl and HF compounds.

In a fourth alternative exemplary embodiment of the invention, an HCl/HF sorbent from a hopper 58 is introduced via stream 60 into the coal derived fuel gas line 38 upstream of the secondary cyclone or barrier filter 40. Here, the sorbent reacts with the HCl/HF during the relatively short flying time in stream 38 and is then captured in the barrier filter 40, forming a cake of partially reacted sorbent which further reacts with HCl and HF.

In each of the above described embodiments, substantially all, i.e., between 98 and 99%, HCl and HF can be removed from the coal derived gas stream so that the system as a whole is capable of removing substantially all of the major pollutants from the coal derived gas stream. It will be understood by those of ordinary skill in the art that the amount of sorbent required to remove the HCl and HF will be determined by the amounts of HCl and HF present in the gas stream, consistent with reactions (1) and (2).

It will be appreciated that the HCl/HF sorbent may be introduced into the gas stream at any one or all of the above described locations, depending on the particular circumstances surrounding the application of the process.

In carrying out the above described process, it will be appreciated that the various hardware components utilized therein are well known in the art and need not be described here.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a process stream for removing sulfur compounds from a hot coal derived fuel gas stream containing $H_2S$, COS, HCl and HF upstream of a power plant, the improvement comprising:
   (a) introducing a sorbent material at a location and in an amount effective to break down at least the HCl and HF constituents into solid salts and gaseous $CO_2$ and $H_2O$ at least partially concurrently with the removal of the sulfur compounds; and
   (b) removing the solid salts from the stream.

2. The process of claim 1 wherein the sorbent powder is selected from the group consisting of nacholite, sodium bicarbonate, sodium carbonate and Trona.

3. The process of claim 1 wherein the sorbent is in powder form.

4. The process of claim 2 wherein the sorbent is in powder form.

5. The process of claim 1 wherein the hot gas stream is at a temperature of between about 350°–700° C.

6. The process of claim 1 wherein the hot gas stream is at a temperature of between about 350°–700° C.

7. The process of claim 1 wherein, after step (b), the gas stream is fed to the power plant.

8. A process of removing pollutants from a hot sulfur and hydrogen chloride and/or hydrogen fluoride laden gas stream upstream of a gas turbine generator comprising the steps of:
   (a) passing the stream into a primary cyclone;
   (b) passing gas effluent from the primary cyclone into an absorber containing a sulfur sorbent;
   (c) passing a primary stream of cleaned gas from the absorber into a secondary cyclone or alternate particulate removal system for additional removal of particulate material from the primary stream;
   (d) simultaneously with step (c), passing particulates captured in the absorber to a regenerator;
   (e) passing particulates in the regenerator to a fines separator;
   (f) passing coarse material from the fines separator to a sorbent elevator;
   (g) recycling coarse material from the sorbent elevator to the absorber;
   (h) introducing the HCl/HF sorbent into the process stream in an amount and at a location upstream of said secondary cyclone so as to react with HCl and/or HF in the gas stream to produce solid NaCl and/or NaF, gaseous $CO_2$ and $H_2O$; and wherein clean gas from said secondary cyclone is fed to the gas turbine generator.

9. The process according to claim 8 wherein the HCl/HF sorbent is introduced directly into the absorber.

10. The process according to claim 8 wherein the HCl/HF sorbent is introduced into the gas stream between the primary cyclone and the absorber.

11. The process according to claim 8 wherein the HCl/HF sorbent is introduced into the coarse material between the fines separator and the sorbent elevator.

12. The process according to claim 8 wherein the HCl/HF sorbent is introduced into the gas effluent between the absorber and the secondary cyclone.

13. The process according to claim 8 wherein the HCl/HF sorbent comprises one of nahcolite, sodium carbonate and sodium bicarbonate.

14. The process according to claim 8 wherein the hot gas stream is at a temperature of between 350° and 700° C.

15. The process according to claim 14 wherein said hot gas stream is pressurized to about 600 p.s.i.g.

16. The process of claim 8 wherein the hot gas stream comprises a gas derived from a coal gasification process.

17. The process according to claim 8 wherein clean gas from said secondary cyclone is fed to a gas turbine generator.

18. A process for removing pollutants from a hot sulphur and hydrogen chloride and/or hydrogen fluoride laden gas stream upstream of a power plant comprising the steps of:
- (a) passing the stream into a primary cyclone;
- (b) passing gas effluent from the primary cyclone into an absorber containing a sulfur sorbent;
- (c) passing a primary stream of cleaned gas from the absorber into a secondary cyclone or alternate particulate removal system for additional removal of particulate material from the primary stream; and
- (d) introducing an HCl/HF sorbent into the process stream in an amount and at a location upstream of said secondary cyclone that is effective to react with HCl/HF in the gas stream to produce solid NaCl and/or NaF, gaseous $CO_2$ and $H_2O$.

19. The process according to claim 18 wherein the HCl/HF sorbent is introduced directly into the absorber.

20. The process according to claim 18 wherein the HCl/HF sorbent is introduced into the gas stream between the primary cyclone and the absorber.

21. The process according to claim 18 wherein the HCl/HF sorbent is introduced into the gas effluent between the absorber and the secondary cyclone.

22. The process according to claim 18 and including the further steps of:
- (e) simultaneous with step (c), passing particulates captured in the absorber to a regenerator;
- (f) passing particulates captured in the regenerator to a fines separator;
- (g) passing coarse material from the fines separator to a sorbent elevator; and introducing the HCl/HF sorbent into the coarse material between the fines separator and the sorbent elevator.

23. The process of claim 18 wherein the sorbent is in powder from and is selected from the group consisting of nacholite, sodium bicarbonate, sodium carbonate, and Trona.

24. The process according to claim 18 wherein the hot gas stream is at a temperature of between 350° and 700° C.

25. The process according to claim 18 wherein said hot gas stream is pressurized to about 600 p.s.i.g.

26. The process of claim 18 wherein the hot gas stream comprises a gas derived from a coal gasification process.

27. The process of claim 18 wherein the primary stream of cleaned gas from the secondary cyclone is fed to the power plant which comprises a gas turbine generator.

* * * * *